United States Patent
Inada et al.

(10) Patent No.: US 9,297,512 B2
(45) Date of Patent: Mar. 29, 2016

(54) LIGHT FLUX CONTROLLING MEMBER, LIGHT EMITTING DEVICE AND ILLUMINATION APPARATUS

(71) Applicant: Enplas Corporation, Saitama (JP)

(72) Inventors: Aki Inada, Saitama (JP); Noriyuki Kawahara, Saitama (JP)

(73) Assignee: Enplas Corporation, Saitama (JP)

( * ) Notice: Subject to any disclaimer, the term of this patent is extended or adjusted under 35 U.S.C. 154(b) by 146 days.

(21) Appl. No.: 14/325,408

(22) Filed: Jul. 8, 2014

(65) Prior Publication Data
US 2015/0016119 A1  Jan. 15, 2015

(30) Foreign Application Priority Data
Jul. 12, 2013 (JP) ................. 2013-146190

(51) Int. Cl.
| F21V 3/00 | (2015.01) |
| F21V 5/04 | (2006.01) |
| F21V 5/08 | (2006.01) |
| G02B 3/00 | (2006.01) |
| A01G 7/04 | (2006.01) |
| F21Y 101/02 | (2006.01) |
| F21Y 103/00 | (2006.01) |

(52) U.S. Cl.
CPC .............. *F21V 5/045* (2013.01); *A01G 7/045* (2013.01); *F21V 5/08* (2013.01); *G02B 3/00* (2013.01); *F21Y 2101/02* (2013.01); *F21Y 2103/003* (2013.01)

(58) Field of Classification Search
CPC .......... A01G 7/045; F21V 5/08; F21V 5/045; G02B 3/00; F21Y 2103/003
USPC ........... 362/311.01, 311.06, 311.02, 332, 336
See application file for complete search history.

(56) References Cited

U.S. PATENT DOCUMENTS

| 2003/0202241 A1* | 10/2003 | Blumel ........... F21V 5/007 359/365 |
| 2010/0027271 A1* | 2/2010 | Wilcox ........... F21S 8/081 362/311.02 |
| 2010/0073951 A1* | 3/2010 | Yatsuda ........... F21K 9/00 362/539 |
| 2013/0051029 A1* | 2/2013 | Suzuki ........... F21V 5/045 362/297 |

FOREIGN PATENT DOCUMENTS

JP  2008-153154 A  7/2008

* cited by examiner

*Primary Examiner* — Evan Dzierzynski
*Assistant Examiner* — Matthew Peerce
(74) *Attorney, Agent, or Firm* — Brundidge & Stanger, P.C.

(57) ABSTRACT

Incidence region 162 of light flux controlling member 160 includes first lens region 10 and second lens region 50 which have a fan shape in a plan view thereof. First lens region 10 includes a plurality of first projections 172. In first inclining surface 174 of first projection 172, angle $\theta_{11}$ on a first cross section and angle $\theta_{21}$ on a second cross section in a direction orthogonal to the first cross section are both larger than 0°. In second inclining surface 176, angle $\theta_{12}$ on the second cross section is larger than angle $\theta_{22}$ on the second cross section.

9 Claims, 12 Drawing Sheets

LIGHT FLUX CONTROLLING MEMBER, LIGHT EMITTING DEVICE AND ILLUMINATION APPARATUS

CROSS REFERENCE TO RELATED APPLICATIONS

This application is entitled and claims the benefit of Japanese Patent Application No. 2013-146190, filed on Jul. 12, 2013, the disclosure of which including the specification, drawings and abstract is incorporated herein by reference in its entirety.

TECHNICAL FIELD

The present invention relates to a light flux controlling member which controls light distribution of light emitted from a light emitting element. The present invention further relates to a light emitting device having the light flux controlling member and an illumination apparatus having the light emitting device.

BACKGROUND ART

In recent years, from the viewpoint of energy conservation, light-emitting diodes (hereinafter, referred to as "LEDs") have been used as light sources in place of fluorescent light and halogen lamps. Such a light emitting device which uses an LED as a light source may, in some cases, be disposed obliquely with respect to a surface to be irradiated (hereinafter, also referred to as an "irradiation surface") instead of being disposed directly above the irradiation surface according to applications of the light emitting device.

For example, when a plant is cultivated using a shelf provided indoors, a light emitting device which is disposed obliquely with respect to a plate of the shelf, illuminates the plant disposed on the plate of the shelf. When the light emitting device is disposed obliquely with respect to a planar irradiation surface in this manner and an LED is used as is as the light emitting device, most of light emitted from the LED is undesired light which is not directed to the irradiation surface, and it is impossible to efficiently illuminate the irradiation surface. Further, the undesired light enters the eyes of workers, which makes it difficult for the workers to work. As means for solving the above problem, a lens which controls light distribution of the light emitted from the LED may be used in combination with the LED (see PTL 1, for example).

PTL 1 discloses an illumination apparatus which has a planer irradiation surface, a plurality of LEDs disposed on a straight line which is parallel to the irradiation surface, and a compound lens which covers the plurality of LEDs. In the illumination apparatus of PTL 1, the plurality of LEDs and the compound lens are disposed so that both light-emitting surfaces of the LEDs and an emission surface of the compound lens are perpendicular to the irradiation surface. The compound lens has the same cross-sectional shape at any point of the compound lens in a direction orthogonal to the direction of the disposed LEDs. Further, a shape of an incidence region (region facing the LEDs) of the compound lens is asymmetric with respect to a plane which includes optical axes of the LEDs and is parallel to the direction of the disposed LEDs. In this way, because in the illumination apparatus disclosed in PTL 1, the compound lens has a shape which is asymmetric between a side of the irradiation surface and an opposite side of the irradiation surface, even if the illumination apparatus is not disposed directly over the irradiation surface, the illumination apparatus can illuminate the irradiation surface uniformly to some extent.

CITATION LIST

Patent Literature

PTL 1
Japanese Patent Application Laid-Open No. 2008-153154

SUMMARY OF INVENTION

Technical Problem

Meanwhile, there is a case where in the illumination apparatus, the light emitting device cannot be disposed at a position perpendicular to the irradiation surface as described above because of a structure of the illumination apparatus, nature of an object to be irradiated, or the like. In this case, the light emitting device is often disposed obliquely with respect to the irradiation surface. When the illumination apparatus of PTL 1 is disposed obliquely with respect to the irradiation surface, part of the irradiation surface near the light source may become too bright, while brightness of part of the irradiation surface away from the light source may be insufficient.

It is therefore an object of the present invention to provide a light flux controlling member which can emit light farther away on the irradiation surface and can uniformly radiate light on the irradiation surface when the light flux controlling member is disposed obliquely with respect to the irradiation surface. Further, an object of the present invention is to provide a light emitting device and an illumination apparatus which have the light flux controlling member.

Solution to Problem

A light flux controlling member according to the present invention which controls light distribution of light emitted from a light emitting element, has an incidence region on which the light emitted from the light emitting element is incident, and an emission region from which the incident light from the incidence region is emitted, in which the incidence region includes a first lens region and a second lens region which respectively have a fan shape in a plan view thereof, the first lens region includes a projection having an arc shape in a plan view of the projection, the projection having a first inclining surface on which part of the light emitted from the light emitting element is incident and a second inclining surface at which the light incident from the first inclining surface is reflected toward the emission region, the second lens region receives incidence of the other part of the light emitted from the light emitting element and directs the incident light to the emission region, and, when a straight line which passes through an intersection point of a radius of the fan shape of the first lens region and a radius of the fan shape of the second lens region and which is parallel to a direction in which the incidence region is viewed in a plan view thereof is defined as a central axis of the light flux controlling member, a cross section of the projection when cut at a point on a first plane which includes the central axis and which passes through a center of an arc of the projection is defined as a first cross section, a cross section of the projection when cut on a second plane which includes the central axis and which intersects with the first plane is defined as a second cross section, and, in the first cross section, when a vertex angle of the projection is divided by a straight line parallel to the central axis, an angle formed by the first inclining surface with respect to the straight line is defined as $\theta_{11}$, an angle fanned by the second inclining surface with respect to the straight line is defined as $\theta_{12}$, and, in the second cross section, when a vertex angle of the projection is divided by the straight line, an angle formed by the first inclining surface with respect to the straight line is defined as $\theta_{21}$, and an angle formed by the second inclining surface with respect to the straight line is defined as $\theta_{22}$, the angle $\theta_{11}$ and the angle of $\theta_{21}$ are both larger than 0°, and the angle of $\theta_{12}$ is larger than the angle of $\theta_{22}$.

A light emitting device according to the present invention has the above-described light flux controlling member and a light emitting element, and an optical axis of the light emitting element coincides with the central axis.

An illumination apparatus according to the present invention has the above-described light emitting device and a planar irradiation surface, and the light emitting device is disposed so that the optical axis of the light emitting element intersects with the irradiation surface at an acute angle and the second lens region is closer to the irradiation surface than the first lens region.

Advantageous Effects of Invention

The light flux controlling member according to the present invention, when being disposed obliquely with respect to the irradiation surface, can uniformly emit light incident from the light emitting element farther away on the irradiation surface from the emission region. Further, the light emitting device according to the present invention, when disposed obliquely with respect to the irradiation surface, can illuminate farther away and uniformly the irradiation surface. Still further, the illumination apparatus according to the present invention can emit light farther away on the irradiation surface and can uniformly radiate light on the irradiation surface.

DESCRIPTION OF EMBODIMENTS

An embodiment of the present invention will be described below in detail with reference to the accompanying drawings.

Figure 1A:
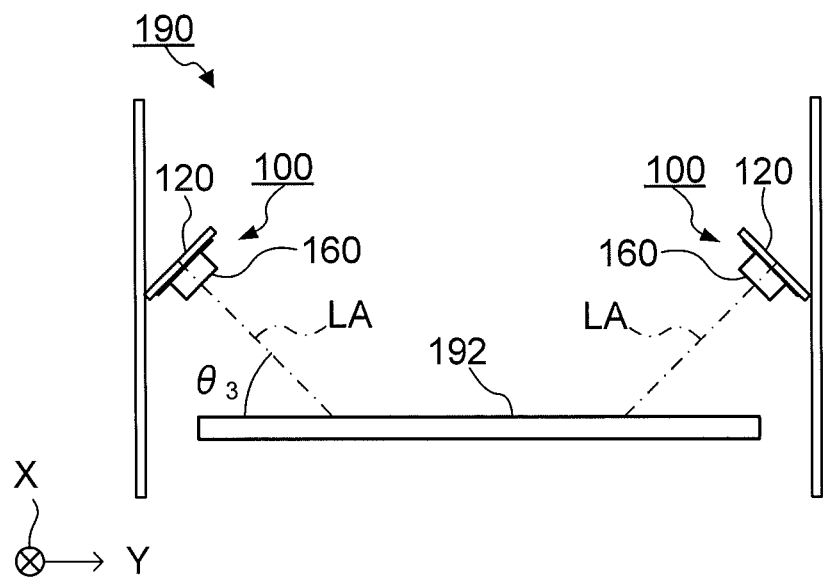
FIG. 1A schematically illustrates a configuration of an illumination apparatus according to one embodiment of the present invention.
Figure 1B:
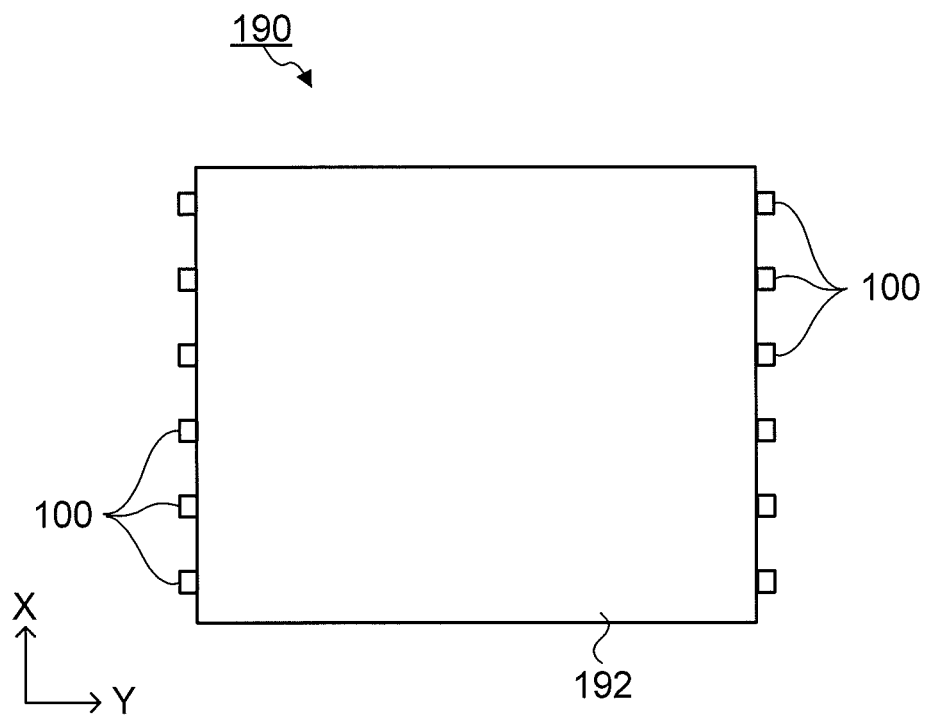
FIG. 1B schematically illustrates the configuration of the illumination apparatus in a plan view thereof.

FIGS. 1A and 1B schematically illustrate a configuration of illumination apparatus 190 according to the present embodiment. FIG. 1A is a side view of illumination apparatus 190, and FIG. 1B is a plan view of illumination apparatus 190. As illustrated in FIGS. 1A and 1B, illumination apparatus 190 has a plurality of light emitting devices 100 and planar irradiation surface 192. Light emitting devices 100 include light flux controlling members 160 and light emitting elements which are not illustrated.

Light emitting devices 100 are disposed in a line directly above each of a pair of sides of irradiation surface 192. In each of the lines, six light emitting devices 100 are disposed. Light emitting devices 100 in each line are disposed at equal intervals. Note that the direction in which light emitting devices 100 are arrayed is defined as X direction, and a direction in which light emitting devices 100 face each other is defined as Y direction.

Each light emitting device 100 is supported by substrate 120 so as to be disposed at a predetermined height from irradiation surface 192 and so that optical axes LA of light emitting elements (reference numeral 140 in FIG. 2) intersect with irradiation surface 192 at angle $\theta_3$ (for example, 45°). A height of each light emitting device 100 from irradiation surface 192 can be freely adjusted. Note that angle $\theta_3$ that optical axes LA intersect with irradiation surface 192 should not particularly be limited, and is adjusted to be larger than 0° and less than 90° so as to provide higher uniformity of illuminance on irradiation surface 192.

Figure 2:
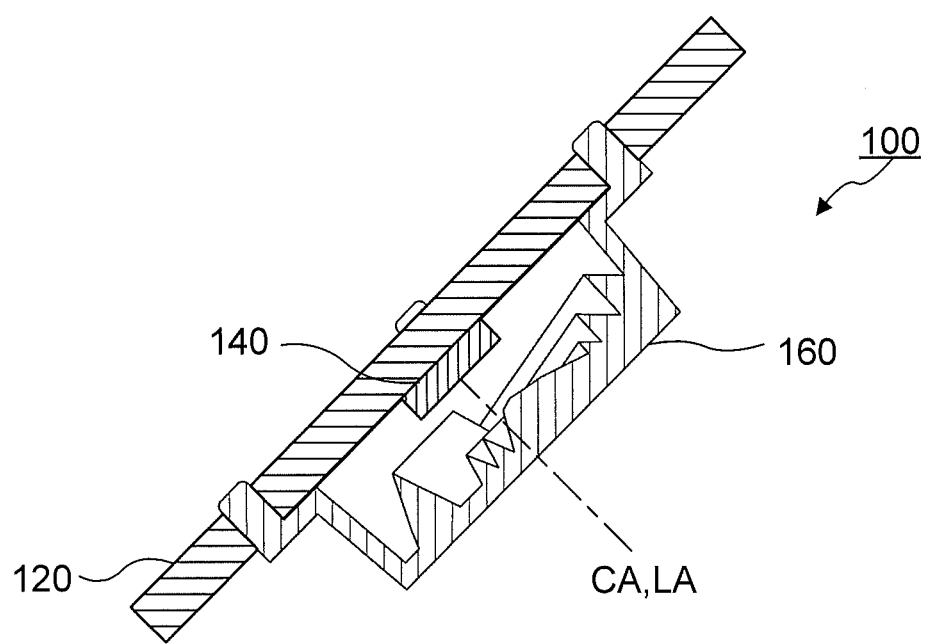
FIG. 2 illustrates a configuration of a light emitting device according to one embodiment of the present invention.

FIG. 2 is a cross-sectional view of light emitting device 100. FIG. 2 illustrates light emitting device 100 fixed on substrate 120.

As illustrated in FIG. 2, light emitting device 100 has light emitting element 140 and light flux controlling member 160. Light emitting element 140 is a light-emitting diode (LED) such as a white light-emitting diode. Light flux controlling member 160 controls light distribution of light emitted from light emitting element 140. Light flux controlling member 160 is disposed with respect to light emitting element 140 so that optical axis LA of light emitting element 140 coincides with central axis CA of light flux controlling member 160.

Figure 3A:
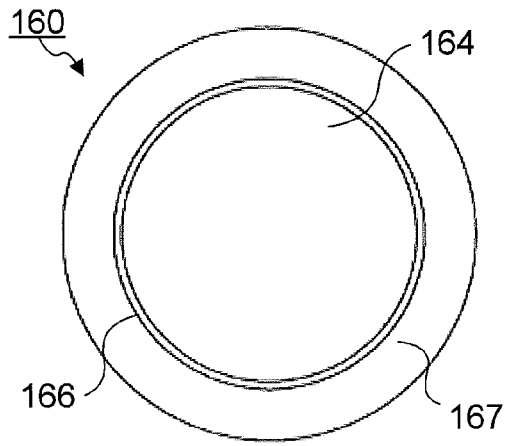
FIG. 3A is a plan view of a light flux controlling member according to one embodiment of the present invention.
Figure 3B:
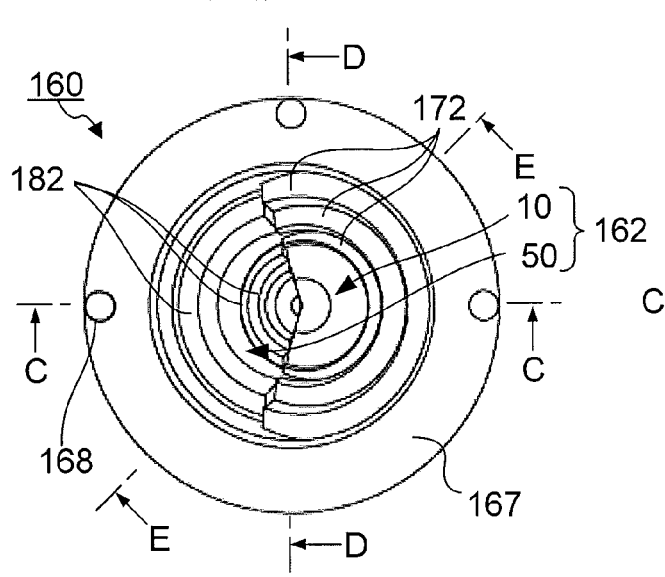
FIG. 3B is a bottom view of the light flux controlling member.
Figure 3D:
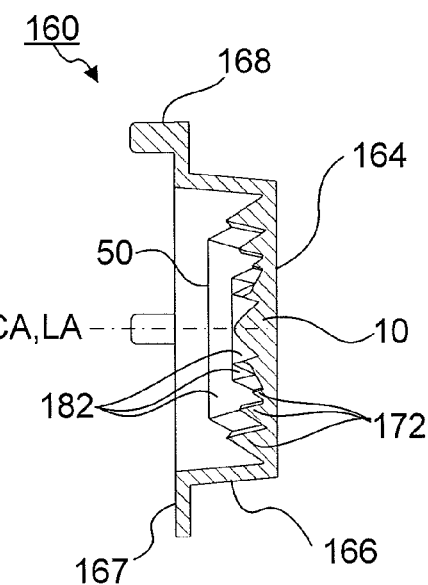
FIG. 3D illustrates a cross section of the light flux controlling member along line D-D in FIG. 3B.
Figure 3C:
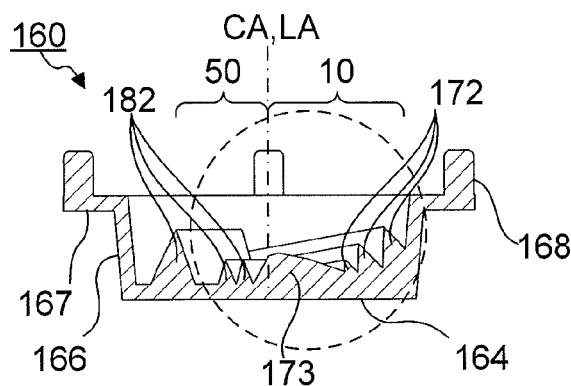
FIG. 3C illustrates a cross section of the light flux controlling member along line C-C in FIG. 3B.
Figure 3E:
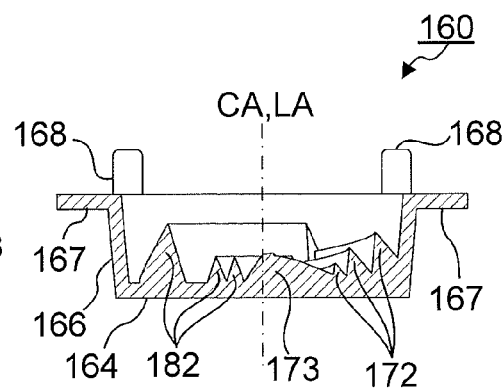
FIG. 3E illustrates a cross section of the light flux controlling member along line E-E in FIG. 3B.
Figure 4A:
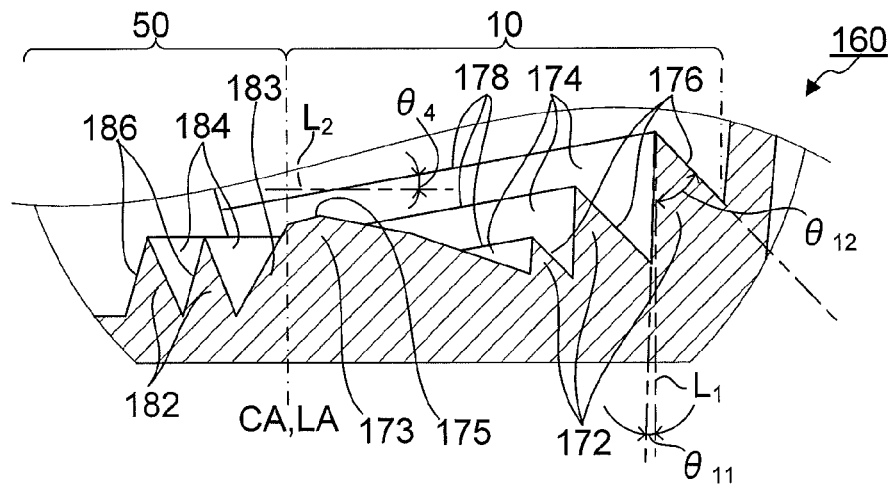
FIG. 4A illustrates a dashed line portion in FIG. 3C on an enlarged scale.
Figure 4B:
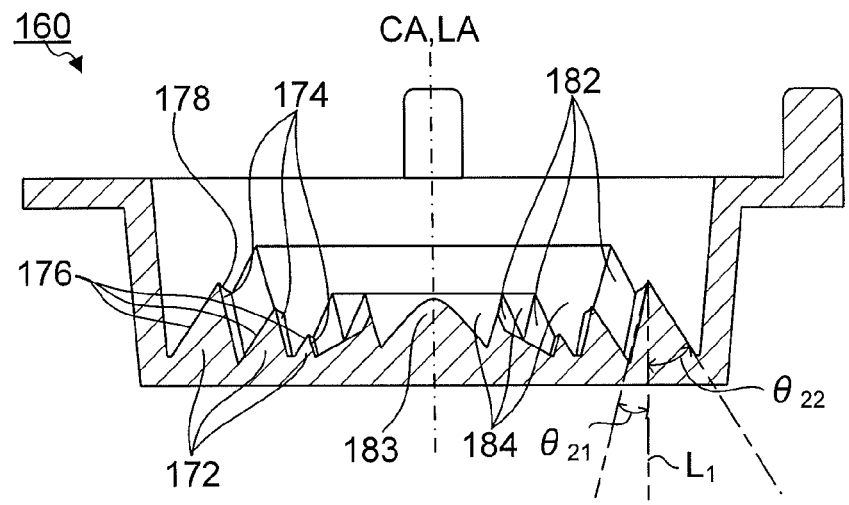
FIG. 4B illustrates the cross section of the light flux controlling member along the line D-D in FIG. 3B on an enlarged scale.
Figure 4C:
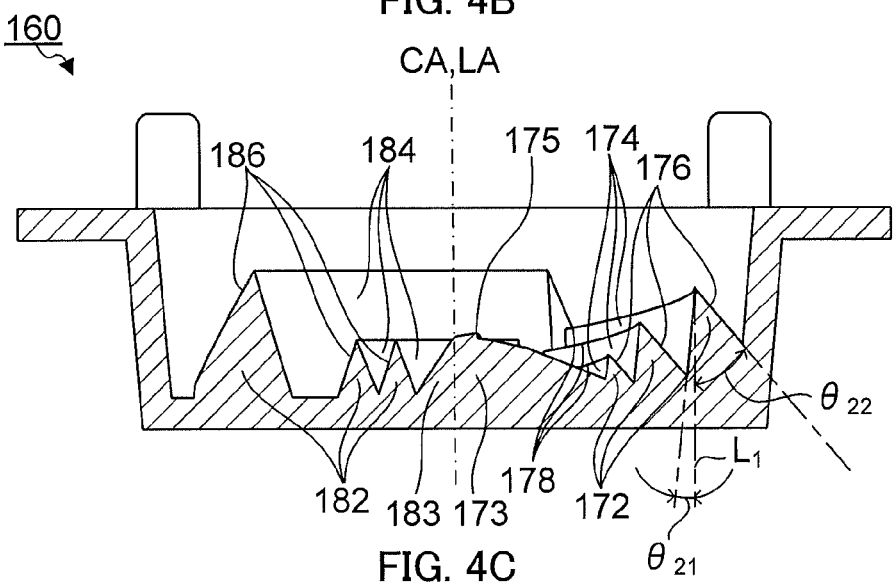
FIG. 4C illustrates the cross section of the light flux controlling member along the line E-E in FIG. 3B on an enlarged scale.

FIGS. 3A to 3E and FIGS. 4A to 4C illustrate a configuration of light flux controlling member 160 in the present embodiment. FIG. 3A is a plan view of light flux controlling member 160, and FIG. 3B is a bottom view of light flux controlling member 160. FIG. 3C is a cross-sectional view of light flux controlling member 160 along line C-C in FIG. 3B, FIG. 3D is a cross-sectional view of light flux controlling member 160 along line D-D in FIG. 3B, and FIG. 3E is a cross-sectional view of light flux controlling member 160 along line E-E in FIG. 3B. FIG. 4A illustrates a dashed line portion of FIG. 3C on an enlarged scale, FIG. 4B illustrates a cross section of light flux controlling member 160 along line D-D on an enlarged scale, and FIG. 4C illustrates a cross section of light flux controlling member 160 along line E-E on an enlarged scale.

As illustrated in FIGS. 3A to 3E and FIGS. 4A to 4C, light flux controlling member 160 has incidence region 162 on which light emitted from light emitting element 140 is incident, emission region 164 which is positioned at an opposite side of incidence region 162 and from which the light incident from incidence region 162 is emitted, and a tube portion 166 which positions incidence region 162 and emission region 164.

Light flux controlling member 160 has a bottomed cylinder-like shape. One side of a circular plate-like portion corresponding to a bottom plate portion of the bottomed cylinder-like shape (surface facing inside of a cylinder) is incidence region 162, while the other side of circular plate-like portion is emission region 164. Tube portion 166 has a substantially cylindrical shape. Tube portion 166 supports the above-described plate-like portion from a side of incidence region 162.

Light flux controlling member 160 is formed by integral molding. Materials of light flux controlling member 160 should not particularly be limited as long as the materials allow light of a desired wavelength to pass therethrough. For example, the materials of light flux controlling member 160 include light transmissive resins such as polymethylmethacrylate (PMMA), polycarbonate (PC), or epoxy resins, and glass.

Incidence region 162 is a region through which part of the light emitted from light emitting element 140 is incident on light flux controlling member 160. Incidence region 162 is formed at a portion (positioned at an opposite side of emission region 164) of light flux controlling member 160 facing light emitting element 140 in light emitting device 100.

Central axis CA of light flux controlling member 160 is a geometric central axis of light flux controlling member 160. For example, central axis CA in the present embodiment passes through a center of a planar view shape (circle) of incidence region 162 and also serves as a central axis of tube portion 166. In this way, the central axis can be a geometric central axis of a practical portion in the planar view shape of light flux controlling member 160.

Incidence region 162 includes first lens region 10 and second lens region 50. First lens region 10 and second lens region 50 have a fan shape in a plan view thereof. Central axis CA which is orthogonal to an orthographically projected surface of a planar view shape of light flux controlling member 160, is a straight line that passes through an intersection point of two sides of the fan shape. That is, central axis CA which passes through one intersection point of two sides, each of the two sides being a radius of the fan shape of first lens region 10, and the other intersection point of two sides, each of the two sides being a radius of the fan shape of second lens region 50, is a straight line parallel to a direction in which incidence region 162 is viewed in a plan view of incidence region 162. In the present embodiment, a central angle of the fan shape in a plan view of first lens region 10 is 220°. A central angle of the fan shape in a plan view of second lens region 50 is 140°.

First lens region 10 includes a plurality of first projections 172 which have an arc shape in a plan view thereof. Each of first projections 172 has first inclining surface 174 on which part of light emitted from light emitting element 140 is incident and second inclining surface 176 at which the light incident from first inclining surface 174 is reflected toward emission region 164.

Here, a cross section of light flux controlling member 160 along line C-C in FIG. 3B illustrated in FIG. 3C and FIG. 4A is defined as a first cross section. The first cross section includes central axis CA and centers of arcs of first projections 172. Further, a cross section of light flux controlling member 160 along line D-D in FIG. 3B illustrated in FIG. 3D and FIG. 4B is defined as a second cross section (I). The second cross section (I) includes central axis CA and is orthogonal to line C-C. The first cross section and the second cross section (I) include central axis CA and are orthogonal to each other. Further, a cross section of light flux controlling member 160 along line E-E in FIG. 3B illustrated in FIG. 3E and FIG. 4C is defined as a second cross section (II). The second cross section (II) includes central axis CA and intersects with line C-C. The second cross section (II) intersects with line C-C at a crossing angle of 45°. The first cross section and the second cross section (II) include central axis CA and intersects with each other at 45°. The second cross section (I) and the second cross section (II) also include central axis CA and intersect with each other at 45°.

Further, as illustrated in FIG. 4A, in the first cross section, a vertex angle of first projection 172 is divided into two angles of $\theta_{11}$ and $\theta_{12}$ by straight line $L_1$ which is parallel to central axis CA. $\theta_{11}$ is an angle formed by first inclining surface 174 with respect to straight line $L_1$, while $\theta_{12}$ is an angle formed by second inclining surface 176 with respect to straight line $L_1$. Further, as illustrated in FIG. 4B, in the second cross section (I), a vertex angle of first projection 172 is divided into two angles of $\theta_{21}$ and $\theta_{22}$ by straight line $L_1$ which is parallel to central axis CA. Still further, as illustrated in FIG. 4C, also in the second cross section (II), a vertex angle of first projection 172 is similarly divided into two angles of $\theta_{21}$ and $\theta_{22}$ by straight line $L_1$ which is parallel to central axis CA. Also in the second cross section (II), $\theta_{21}$ is an angle formed by first inclining surface 174 with respect to straight line $L_1$, while $\theta_{22}$ is an angle formed by second inclining surface 176 with respect to straight line $L_1$.

The angle of $\theta_{11}$ and the angle of $\theta_{21}$ are both larger than 0°. For example, the angle of $\theta_{11}$ is 2°, the angle of $\theta_{21}$ in the second cross section (II) is 5°, and the angle of $\theta_{21}$ in the second cross section (I) is 14°. Further, the angle of $\theta_{12}$ is larger than the angle of $\theta_{22}$. For example, the angle of $\theta_{12}$ is 44°, the angle of $\theta_{22}$ in the second cross section (II) is 41°, and the angle of $\theta_{22}$ in the first cross section (I) is 32°. Note that along a direction in which first projection 172 is curved, the vertex angle of first projection 172 is constant. That is, the sum of $\theta_{11}$ and $\theta_{12}$ is equal to the sum of $\theta_{21}$ and $\theta_{22}$.

Further, ridge lines 178 are formed between first inclining surfaces 174 and second inclining surfaces 176. As illustrated in FIG. 4A, ridge lines 178 are parallel to each other when viewed along the second cross section (I), and are inclined with respect to straight line $L_2$ which is orthogonal to central axis CA. For example, in FIG. 4A which illustrates the first cross section, angle $\theta_4$ formed by ridge line 178 with respect to straight line $L_2$ is 10°.

Still further, first lens region 10 includes first refractive portion 173 at a side of the center of the above-described fan shape with respect to first projection 172. First refractive portion 173 has a shape in which a substantially conical body whose central axis is inclined by 10° toward second lens region 50 is cut in a vertical direction with the fan shape of second lens region 50 while an apex of the substantially conical body is left. Accordingly, in a plan view of first refractive portion 173, apex 175 of first refractive portion 173 is located within first refractive portion 173. That is, apex 175 is neither located on central axis CA, nor coincides with an intersection point of two sides of the fan shape of first lens region 10.

Further, apex 175 is included in the first cross section. In this way, first lens region 10 has a structure in which, as if, a light flux controlling member including a refractive portion and a reflective type Fresnel lens portion which encloses the refractive portion on a plane (hereinafter, also referred to as a "pre-light flux controlling section") is inclined by 10° and is cut in a vertical direction with the fan shape of second lens region 50 while an apex of the refractive portion of the pre-light flux controlling section is left within the pre-light flux controlling section in a plan view of first lens region 10. The above-described plane on which the refractive portion and the reflective type Fresnel lens portion of the pre-light flux controlling section are formed is a plane parallel to an orthographically projected surface for illustration of the pre-light flux controlling section in a plan view thereof. For example, the plane corresponds to an inner bottom face of the bottomed cylindrical container on which the above-described pre-light flux controlling section is disposed to build a structure like light flux controlling member 160.

Accordingly, a center of curvature of the planar view shape (arc) of first projection 172 of first lens region 10 is located on the central axis of the above-described substantially conical body which passes through apex 175 and within first lens region 10 in a plan view of first lens region 10. In this way, both first projections 172 and first refractive portion 173 of first lens region 10 are disposed obliquely with respect to a first horizontal surface, for example, emission region 164, and ridge lines 178 of first projections 172 are also formed obliquely with respect to the horizontal surface.

Second lens region 50 receives incidence of the other part of the light emitted from light emitting element 140 and directs the incident light to emission region 164 by, for example, reflection. In the present embodiment, second lens region 50 includes a plurality of second projections 182 which have an arc shape in a plan view thereof. Second projections 182 have third inclining surfaces 184 at which the other part of the light emitted from light emitting element 140 is incident and fourth inclining surfaces 186 at which the light incident from the third inclining surfaces is reflected toward emission region 164.

All second projections 182 have a circular arc shape in a plan view thereof in which central axis CA serves as a center of curvature of each of the planar view shapes of second projections 182. In FIG. 3D and FIG. 4B which illustrate the second cross section (I), all ridge lines of second projections 182 are horizontal straight lines. A distance from a bottom of each second projection 182 to emission region 164 is constant at any point of the bottom of each second projection 182. In this way, second projections 182 of second lens region 50 are disposed above the horizontal surface in parallel to the horizontal surface, for example, emission region 164, and the ridge lines of second projections 182 are disposed above the horizontal surface.

Second lens region 50 further includes second refractive portion 183 at a side of the center of the above-described fan shape with respect to second projections 182. Second refractive portion 183 has a shape in which a circular cone is cut from the apex of the circular cone along the central axis with the fan shape of first lens region 10. The central axis of the circular cone coincides with central axis CA. In this way, both second projections 182 and second refractive portion 183 of second lens region 50 are disposed in parallel to the horizontal surface, for example, emission region 164.

First refractive portion 173 and second refractive portion 183 are united at a central portion of incidence region 162. The united refractive portions are integrally molded. The shape of the surface of the refractive portions should not particularly be limited, and may include a plane, a spherical surface or a non-spherical surface. Further, the united refractive portions may be a refractive type Fresnel lens.

Emission region 164 is a region from which the light incident from incidence region 162 is emitted. Emission region 164 is a plane formed at a side of the irradiation surface which is opposite side of light emitting element 140. In the present embodiment, emission region 164 is formed so as to be orthogonal to optical axis LA of light emitting element 140.

Tube portion 166 is a member for positioning light flux controlling member 160 with respect to light emitting element 140. In the present embodiment, tube portion 166 is integrally formed with a portion having a light controlling function at which incidence region 162 and emission region 164 are formed. Tube portion 166 which is positioned at an outer peripheral portion of light flux controlling member 160, is formed in a substantially cylindrical shape. Tube portion 166 supports a circular plate-like portion at which incidence region 162 and emission region 164 are formed, while transmits outside the light which has been emitted from light emitting element 140 but which has not been incident on incidence region 162. At a lower end portion of tube portion 166, flange portion 167 which allows increase of an installation area with respect to substrate 120 is provided (see FIGS. 3A to 3E). Flange portion 167 is an annular plate which extends in a radial direction from one end of tube portion 166.

Flange portion 167 has three bosses 168. Each of bosses 168 is a cylindrical object protruding from a plane of flange portion 167, and bosses 168 are disposed at three points including two points on line C-C and one point on line D-D along an outer periphery of flange portion 167, respectively. In this way, boss 168 is asymmetrically disposed on line D-D. Bosses 168 enable light flux controlling member 160 to be provided to direct a specific orientation without confusion so that, for example, second lens region 50 is disposed at a side of irradiation surface 192 when light flux controlling member 160 is provided with respect to light emitting element 140.

[Optical Characteristics of Light Flux Controlling Member]

In order to emit light farther away when obliquely disposed (for example, disposed so that optical axis LA is oblique to the irradiation surface), light flux controlling member 160 is basically configured so that the light incident on first lens region 10 and second lens region 50 are emitted from emission region 164 toward a side of first lens region 10 with respect to optical axis LA.

Particularly, as described above, first lens region 10 has first projections 172 and first refractive portion 173. First projections 172 make part of the light emitted from light emitting element 140 incident on inside of light flux controlling member 160 and reflect the incident light toward emission region 164.

In FIG. 4A which illustrates the above-described first cross section of light flux controlling member 160, first projections 172 are, for example, disposed in a state where, as if, the above-described reflective type Fresnel lens portion of the pre-light flux controlling section is inclined by 10° toward second lens region 50. Accordingly, an inclination angle of first inclining surface 174 is closer to vertical ($\theta_{11}$ becomes smaller). Therefore, in a direction along the first cross section (direction along line C-C in FIG. 3B), the light emitted from light emitting element 140 at a larger angle with respect to optical axis LA is prone to be incident on first inclining surface 174. Further, in the direction along the first cross section, an inclination angle of second inclining surface 176 is closer to horizontal ($\theta_{12}$ becomes larger). Therefore, the light incident from first inclining surface 174 is reflected at second inclining surface 176 at a larger reflection angle. As a result, the light is emitted from emission region 164 at a larger angle with respect to optical axis LA. In this way, in the direction along the first cross section, first projections 172 make it easier for the emitted light from light emitting element 140 to be incident and make it possible to emit the light from emission region 164 at a larger emission angle with respect to optical axis LA. This is a characteristic effect of the structure of the reflective type Fresnel lens portion of the pre-light flux controlling section which is obliquely disposed.

Meanwhile, while in the above-described second cross-section (I), first projections 172 correspond to the reflective type Fresnel lens portion in a state where the pre-light flux controlling section is inclined by 10° toward second lens region 50, first projections 172 are disposed in a state which is close to a state of the reflective type Fresnel lens portion before the pre-light flux controlling section is inclined, because the second cross section (I) is parallel to a rotation axis when the pre-light flux controlling section is inclined by 10° and is close to the rotation axis, and therefore influence of change of inclination angle $\theta_{21}$ of first inclining surface 174 and inclination angle of $\theta_{22}$ of second inclining surface by inclination of the pre-light flux controlling section is small. Accordingly, first projections 172 reflect the incident light from first inclining surface 174 at second inclining surface 176 and emit the light from emission region 164 at a desired angle with respect to optical axis LA as normally designed as the above-described reflective type Fresnel lens portion. This provides an effect equivalent to that provided by the reflective type Fresnel lens portion of the pre-light flux controlling section which is horizontally disposed as normal.

Further, first refractive portion 173 includes apex 175 of first refractive portion 173 in a plan view thereof. Accordingly, light flux controlling member 160 includes the most part including the center of the refractive portion of the pre-light flux controlling section which confronts light emitting element 140 while pre-light flux controlling section is inclined by 10° toward second lens region 50. Therefore, first refractive portion 173 receives most of the light emitted from light emitting element 140 along optical axis LA or at a small angle with respect to optical axis LA. The light incident on first refractive portion 173 is emitted from emission region 164 at a desired large angle with respect to optical axis LA by designed optical characteristics of first refractive portion 173. This is a characteristic effect of the structure of specific arrangement of the refractive portions of the inclined pre-light flux controlling section.

First lens region 10 continuously exhibits various optical characteristics including optical characteristics close to optical characteristics of first projection 172 in the vicinity of the above-described rotation axis when the pre-light flux controlling section is horizontally disposed as normal and optical characteristics of first projection 172 away from the above-described rotation axis (for example, first projection 172 on the first cross section) when the pre-light flux controlling section is inclined. First lens region 10 which exhibits such special optical characteristics covers a larger area than an area of second lens region 50 in light flux controlling member 160 in a plan view of incidence region 162 in the present embodiment. Therefore, it is possible to prevent the light from being expanded too much in a direction of the second cross section (I) and to increase the amount of light emitted farther away in the first cross section, which may make it possible to uniformly illuminate irradiation surface 192 with sufficient illuminance in illumination apparatus 190 which will be described later.

Modification Example

Light flux controlling member 160 can have the above-described constituent features to be set appropriately within a range where light flux controlling member 160 has the above-described optical characteristics.

For example, a central angle of the planar view shape (fan shape) of first lens region 10 is determined by the inclination angle of the pre-light flux controlling section and a pitch of arrangement of light emitting devices 100. If the central angle is too small, there is a case where sufficient illuminance cannot be obtained at irradiation surface 192 far away from light emitting devices 100, while if the central angle is too large, while it is possible to increase the height of first projections 172 in the first cross section, there is a case where both end portions of first projections 172 and portions in the vicinity of the both end portions cannot be made large enough for light flux control, which may make it difficult to appropriately control an emitting direction of the light from emission region 164. From this viewpoint, at least the central angle of first lens region 10 is preferably 30° or larger and 300° or smaller.

Further, in the present embodiment, both first lens region 10 and second lens region 50 have a shape plane-symmetric with respect to a plane (also referred to as a "first plane") including central axis CA and line C-C. Because emission region 164 of light flux controlling member 160 is a plane orthogonal to central axis CA (that is, plane-symmetric with respect to the first plane), light flux controlling member 160 emits light flux symmetric with respect to the first plane. In light flux controlling member 160, in order to change a degree of light condensation and balance of an emission amount of an emitted light flux divided into two portions on the first plane, at least one of the shape of first lens region 10 and the shape of second lens region 50 may be asymmetric with respect to the first plane.

Further, the number of first projections 172 in first lens region 10 is determined by a size (a diameter size, a thickness, or the like) required for light flux controlling member 160 so as to be sufficient to exhibit a light flux controlling function. If the number of first projections 172 is too small, it is difficult to realize the required thickness of light flux controlling member 160, while if the number of first projections 172 is too big, manufacturing becomes difficult and it is difficult to form first projections 172 with high accuracy. Further, in first lens region 10, in view of light condensing efficiency with respect to the emitted light of light emitting element 140, larger first projections 172 are disposed at the more outer side. The number of second projections 182 in second lens region 50 is also determined to be an optimal value for the same reason as first projections 172. Further, larger second projections 182 are disposed at the more outer side.

Further, an inclination angle of first inclining surface 174 in first projections 172 ($\theta_{11}$ in the first cross section) is preferably larger than 0° in terms of productivity. If the inclination angle is smaller than 0°, an undercut portion is formed, which makes it difficult to extract a product from a mold upon molding, while if the inclination angle is too large, the incident light from first inclining surface 174 may not be directed toward second inclining surface 176. Above-described inclination angle $\theta_{11}$ and $\theta_{21}$ may be identical or may be different among the plurality of first projections 172.

Further, the inclination angle ($\theta_{12}$ in the first cross section) of second inclining surface 176 in first projection 172 is determined from a range where the incident light from first inclining surface 174 can be totally reflected to a desired direction. Above-described inclining angles $\theta_{12}$ and $\theta_{22}$ may be identical or may be different among the plurality of first projections 172.

Further, the shape of a portion formed with the above-described projections such as first projections 172 and second projections 182 in the second cross section (I) of light flux controlling member 160 (hereinafter, also referred to as a "reflective Fresnel in the second cross section (I)") is determined by a distance (pitch) between light emitting devices 100 in the direction of arrayed light emitting devices 100. That is, light condensing capacity of light flux controlling member 160 desired for each light emitting device 100 is set by the pitch of light emitting devices 100. In conjunction with this, for example, the central angle of the fan shape of first lens region 10 is determined to be an angle which can exhibit desired light condensing capacity. The reflective Fresnel in the second cross-section (I) may be configured in first lens region 10 as described in the above-described embodiment, or may be configured in second lens region 50 which is not influenced by inclination of the pre-light flux controlling section, or may be configured in a third lens region which is different from first lens region 10 and second lens region 50.

The shape of the reflective Fresnel in the second cross section (I) of first lens region 10 does not largely change from a design value at the pre-light flux controlling section as long as first projection 172 in the first cross section is close to a rotation axis when the pre-light flux controlling section is inclined even if the pre-light flux controlling section is inclined to an angle appropriate for irradiating a position away from light emitting device 100 in irradiation surface 192. Further, when the above-described reflective Fresnel in the second cross section (I) is configured in second lens region 50, the shape of the reflective Fresnel in the second cross section (I) is determined taking into account brightness on irradiation surface 192 in the vicinity of light emitting devices 100 (for example, immediately below light emitting devices 100) and a degree of light condensation in a lateral direction (the above-described direction light emitting devices 100 are arranged) of light flux controlling member 160 desired for each light emitting device 100 (degree of interference with an area to be irradiated by adjacent light emitting device 100). When the reflective Fresnel in the second cross section (I) is configured in the third lens region, the shape of the reflective Fresnel in the second cross section (I) is determined mainly taking into account the degree of light condensation in the lateral direction of light flux controlling member 160 desired for each light emitting device 100. In this case, flexibility in designing light flux controlling member 160 will further increase.

Further, an angle of $\theta_4$ in first projection 172 (angle formed by ridge line 178 of first projection 172 with respect to straight line $L_2$) is preferably from 3 to 30°, and more preferably, from 6 to 15° in terms of the above-described light condensing efficiency. If the angle of $\theta_4$ is too small, a light emission angle from emission region 164 becomes small, which may reduce illuminance farther away on irradiation surface 192, while if the angle of $\theta_4$ is too large, because a light emission angle of the light emitted from emission region 164 with respect to optical axis LA becomes large, the light to be directed to irradiation surface 192 is reduced, which may make it impossible to provide desired illuminance on irradiation surface 192. $\theta_4$ may be identical or may be different among the plurality of first projections 172.

Further, for example, the shape of second projection 182 in the first cross section is designed to be an appropriate shape as the shape of the reflective Fresnel which has been conventionally known, so as to efficiently illuminate the vicinity of light emitting devices 100 on irradiation surface 192. The inclination angle of third inclining surface 184 and the inclination angle of fourth inclining surface 186 may be identical or may be different among the plurality of second projections 182.

Further, emission region 164 may be a flat face or may be a roughened face so as to reduce uneven illuminance of irradiation surface 192 without largely changing light distribution controlled by incidence region 162. Surface roughness of roughened emission region 164 can be defined with ten-point average roughness $Rz_{JIS}$, arithmetic average roughness Ra, maximum height roughness Rz, or the like (which are all roughness parameters defined by JIS B0601:2013). For example, ten-point average roughness $Rz_{JIS}$ of emission region 164 is preferably 3 µm or less so as not to change an outline of a region to be irradiated, and is preferably 1 µm or greater so as to obtain an appropriate diffusion effect.

Note that while in the present embodiment, as described above, second lens region 50 receives the other part of the light emitted from light emitting element 140 and reflects the incident light toward emission region 164 by projections 182 in a similar manner to first lens region 10, second lens region 50 may direct the other part of the light emitted from light emitting element 140 by means of other than reflection, for example, refraction.

Further, light flux controlling member 160 may include further constituent features within a range light flux controlling member 160 has the above-described optical characteristics.

For example, in each first projection 172, first inclining surface 174 and second inclining surface 176 do not have to be continuous. In this case, another surface is formed between first inclining surface 174 and second inclining surface 176. By providing another surface between first inclining surface 174 and second inclining surface 176 and eliminating an acute-angled portion (ridge line portion), it is possible to improve manufacturability.

A generating line of first inclining surface 174 (first inclining surface 174 in a cross section of first projection 172 (a cross section of light flux controlling member 160 including central axis CA)) may be a straight line or a curved line. An angle of first inclining surface 174 (above-described $\theta_{11}$) with respect to optical axis LA of light emitting element 140 should not particularly be limited as long as the light incident from first inclining surface 174 can be refracted toward second inclining surface 176, and can be set appropriately according to, for example, a size or a position of light emitting element 140. Note that when the generating line of first inclining surface 174 is a curved line, the "angle of first inclining surface 174" is an angle of a tangential line of the generating line of first inclining surface 174. In a similar manner, also in above-described second inclining surface 176, third inclining surface 184 and fourth inclining surface 186, from the above-described viewpoints, generating lines of these inclining surfaces may be respectively straight lines or curved lines.

Further, incidence region 162 may further include other lens regions which, for example, have a fan shape in a plan view thereof, other than first lens region 10 and second lens region 50. The other lens regions may or may not include a Fresnel lens portion. The above-described third lens region is one example of the other lens regions.

[Optical Characteristics of Light Emitting Devices and Illumination Apparatus]

Figure 5:
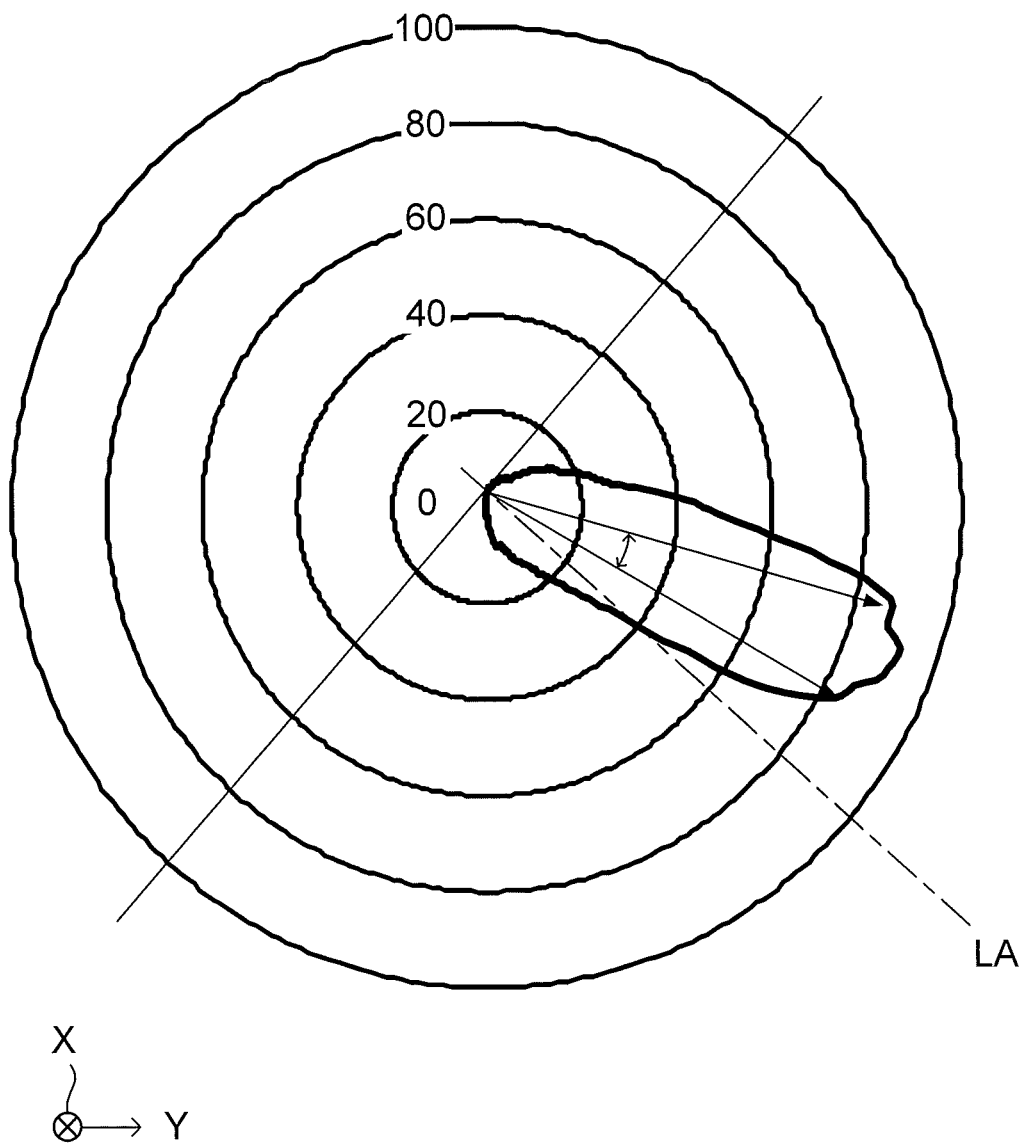
FIG. 5 is a graph illustrating a relative intensity of illuminance in an emitting direction of the light emitting device.
Figure 6A:
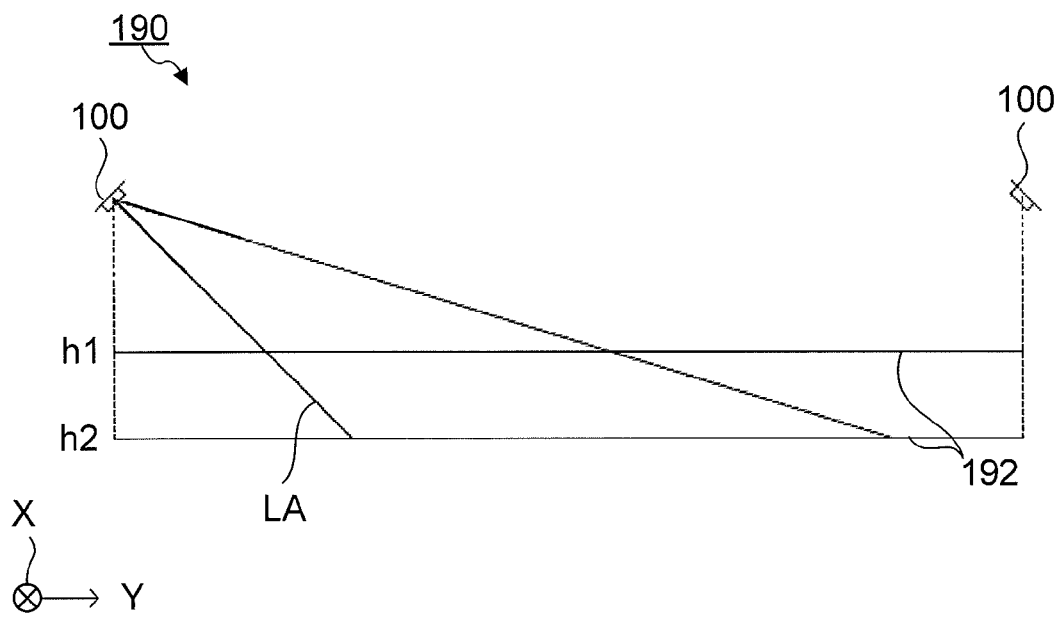
FIG. 6A schematically illustrates optical paths of light emitted from the light emitting devices disposed at one side in the illumination apparatus.
Figure 6B:
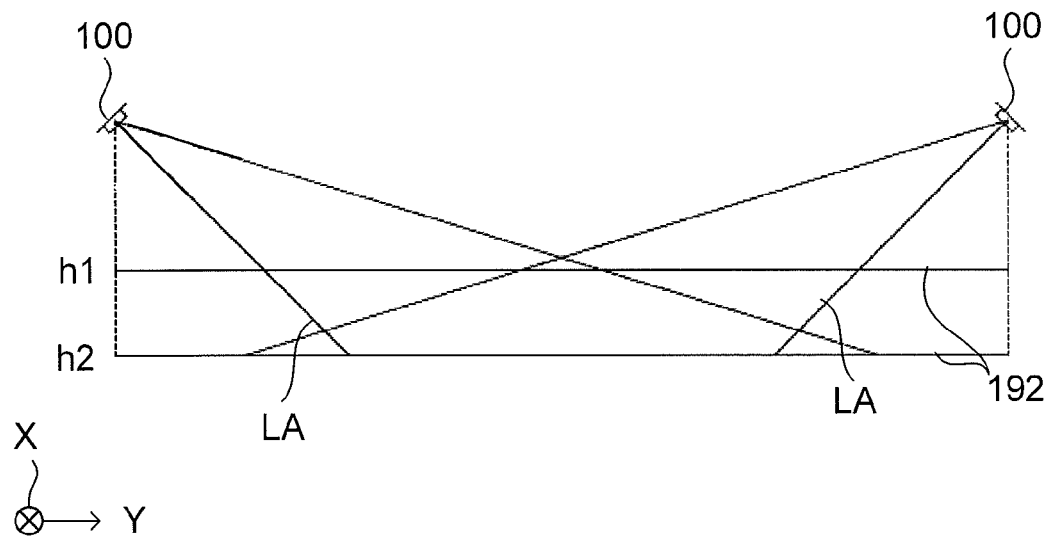
FIG. 6B schematically illustrates optical paths of light emitted from the light emitting devices disposed at both sides in the illumination apparatus.
Figure 7A:
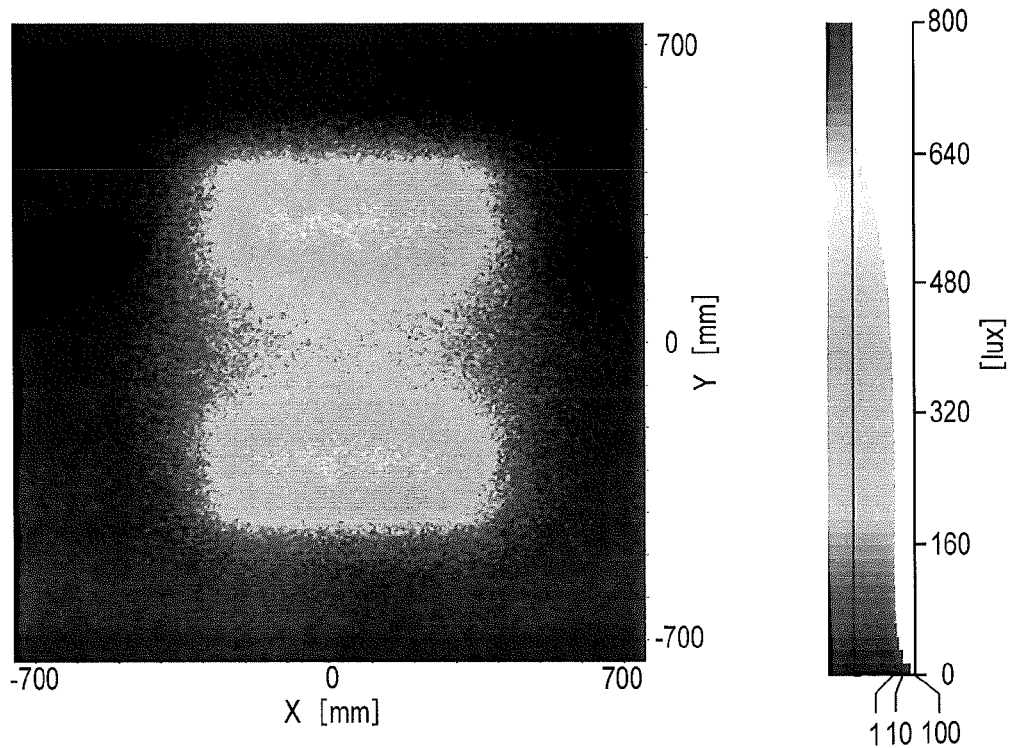
FIG. 7A illustrates illuminance distribution of the irradiation surface of the illumination apparatus when the light emitting devices are located at a height of h1.
Figure 7B:
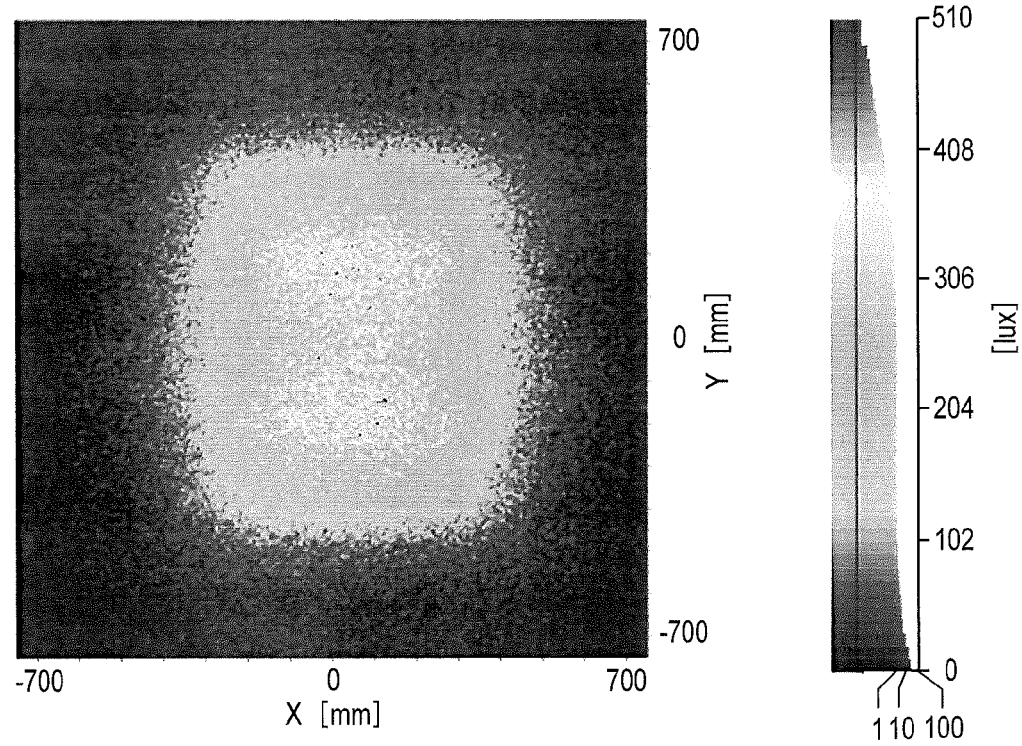
FIG. 7B illustrates illuminance distribution of the irradiation surface of the illumination apparatus when the light emitting devices are located at a height of h2.

FIG. 5 is a graph illustrating a relative intensity of illuminance of light emitting devices 100 in an emitting direction. FIG. 6A schematically illustrates optical paths of the light emitted from light emitting devices 100 disposed at one side in illumination apparatus 190 as a region where main vectors of the emitted light exist. FIG. 6B schematically illustrates optical paths of the light emitted from light emitting devices 100 disposed at both sides in illumination apparatus 190 as a region where main vectors of the emitted light exist. FIG. 7A illustrates illuminance distribution of irradiation surface 192 when light emitting devices 100 are located at a height of h1 in illumination apparatus 190, while FIG. 7B illustrates illuminance distribution of irradiation surface 192 when light emitting devices 100 are located at a height of h2 in illumination apparatus 190.

Note that in FIG. 7A and FIG. 7B, illuminance (L:lux) is obtained through simulation within a range of ±800 mm in an X direction and a Y direction from a reference position (O) which is set at a point 450 mm away from a point immediately below one of light emitting devices 100 of one side which face each other. As described above, the X direction is the direction of arrayed light emitting devices 100, while the Y direction is a direction in which light emitting devices 100 face each other. Further, in FIG. 11A, FIG. 11B, FIG. 12A and FIG. 12B, using the point immediately below one of light emitting devices 100 of one side as the reference position (O), illuminance (L:lux) of a predetermined distance (D:mm) in the Y direction from the reference position is obtained through simulation.

As illustrated in FIG. 5, while light flux controlling member 160 also emits part of light to a side of irradiation surface 192 with respect to optical axis LA, light flux controlling member 160 emits more light to an opposite side of irradiation surface 192 with respect to optical axis LA within a range of a relatively wide emission angle (for example, about 15 to 30° with respect to optical axis LA). The light emitted from light flux controlling member 160 in this wide range has intensity equivalent to a peak value of the emitted light. In this way, light emitting devices 100 emit intense light with intensity close to the peak value to a position farther away from a position where the light of the emission angle in the vicinity of optical axis LA is incident on the irradiation surface.

As a result, as illustrated in FIG. 6A, when the emitting direction of the emitted light from light emitting devices 100 toward an opposite side of the irradiation surface with respect to optical axis LA is displayed using a vector, the emitted light displayed using the vector reaches a large area farther away from the intersection point of optical axis LA and irradiation surface 192 in irradiation surface 192. The vector includes a vector of intense light whose relative intensity corresponds to the peak value as illustrated in FIG. 5 within a range of the above-described relatively wide emission angle. Therefore, in illumination apparatus 190, a farther portion of irradiation surface 192 is uniformly illuminated in a wider range with sufficient illuminance.

Further, as illustrated in FIG. 6B, when light emitting devices 100 are disposed at both sides, illumination apparatus 190 is configured such that a larger area of irradiation surface 192 is uniformly illuminated with intense illuminance. For example, as illustrated in FIG. 6B, light emitting devices 100, located at a height of h1, at both sides respectively illuminate halves of irradiation surface 192. As a result, as illustrated in FIG. 7A, whole irradiation surface 192 is uniformly irradiated with sufficient illuminance.

Further, as illustrated in FIG. 6B, light emitting devices 100, located at a height of h2, at both sides respectively illuminate irradiation surface 192 so that areas reached by the emitted light of light emitting devices 100 on irradiation surface 192 overlap with each other at a central portion of irradiation surface 192. As a result, as illustrated in FIG. 7B, whole irradiation surface 192 is further uniformly irradiated with sufficient illuminance.

Figure 8A:
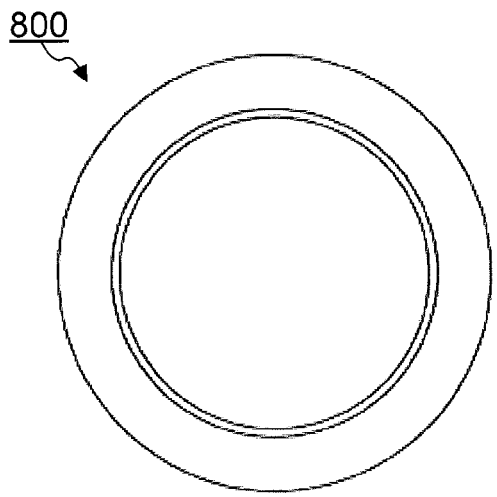
FIG. 8A is a plan view of a light flux controlling member for comparison.
Figure 8B:
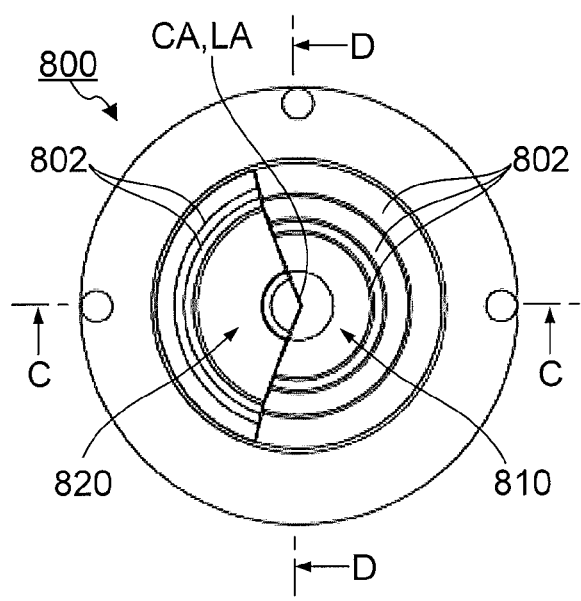
FIG. 8B is a bottom view of the light flux controlling member for comparison.
Figure 8D:
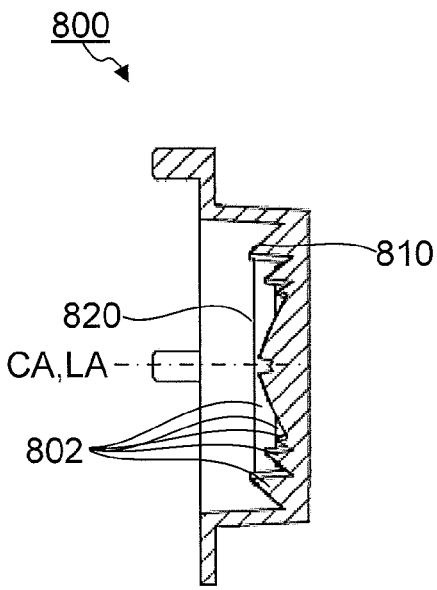
FIG. 8D illustrates a cross section of the light flux controlling member for comparison along line D-D in FIG. 8B.
Figure 8C:
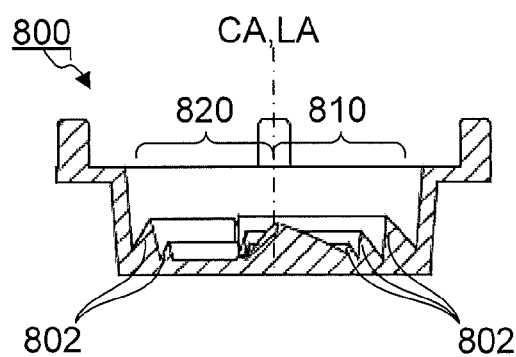
FIG. 8C illustrates a cross section of the light flux controlling member for comparison along line C-C in FIG. 8B.

Here, optical characteristics of a light flux controlling member for comparison which does not have the above-described first projection will be studied. FIGS. 8A to 8D illustrate a configuration of light flux controlling member 800 for comparison. FIG. 8A is a plan view of light flux controlling member 800, FIG. 8B is a bottom view of light flux controlling member 800, FIG. 8C is a cross-sectional view of light flux controlling member 800 along line C-C in FIG. 8B, and FIG. 8D is a cross-sectional view of light flux controlling member 800 along line D-D in FIG. 8B.

Light flux controlling member 800 has projections 802 formed in an incidence region, all having a circular arc shape in a plan view, and an angle of $\theta_{11}$ in the first cross section is equal to an angle of $\theta_{21}$ in the second cross section (I), and an angle of $\theta_{12}$ in the first cross section is equal to an angle of $\theta_{22}$ in the second cross section (I). Further, all of a center of a fan shape in first lens region 810, a center of a fan shape in second lens region 820 and a center of curvature of projections in each lens region overlap with central axis CA. Further, all ridge lines of projections 802 in first lens region 810 and second lens region 820 are parallel to a straight line (above-described straight line $L_2$) which is orthogonal to optical axis LA, and both first lens region 810 and second lens region 820 are (horizontally) formed in parallel to straight line $L_2$. Light flux controlling member 800 differs from above-described light flux controlling member 160 mainly in these points.

Figure 9:
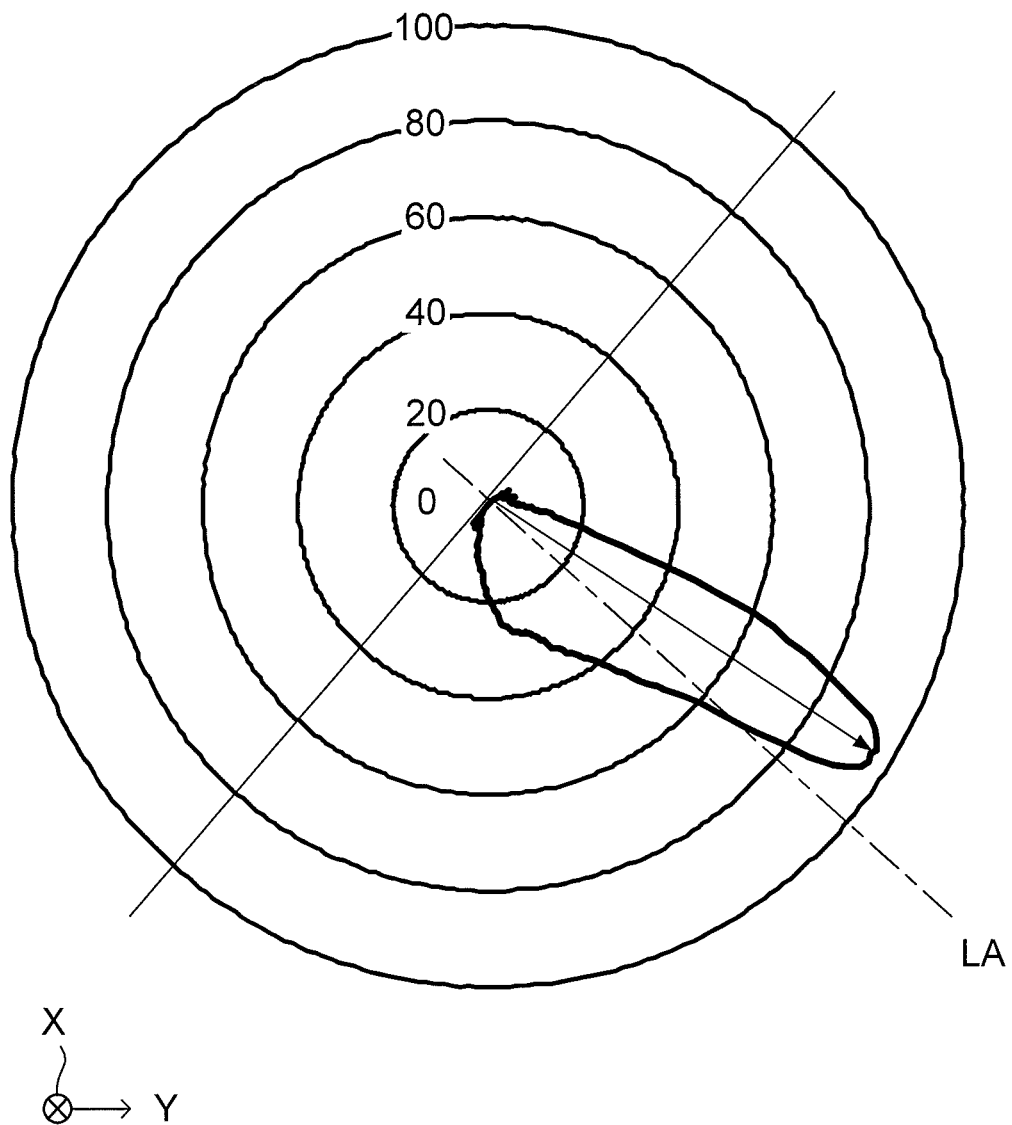
FIG. 9 is a graph illustrating relative intensity of illuminance in an emitting direction of the light emitting device for comparison.
Figure 10A:
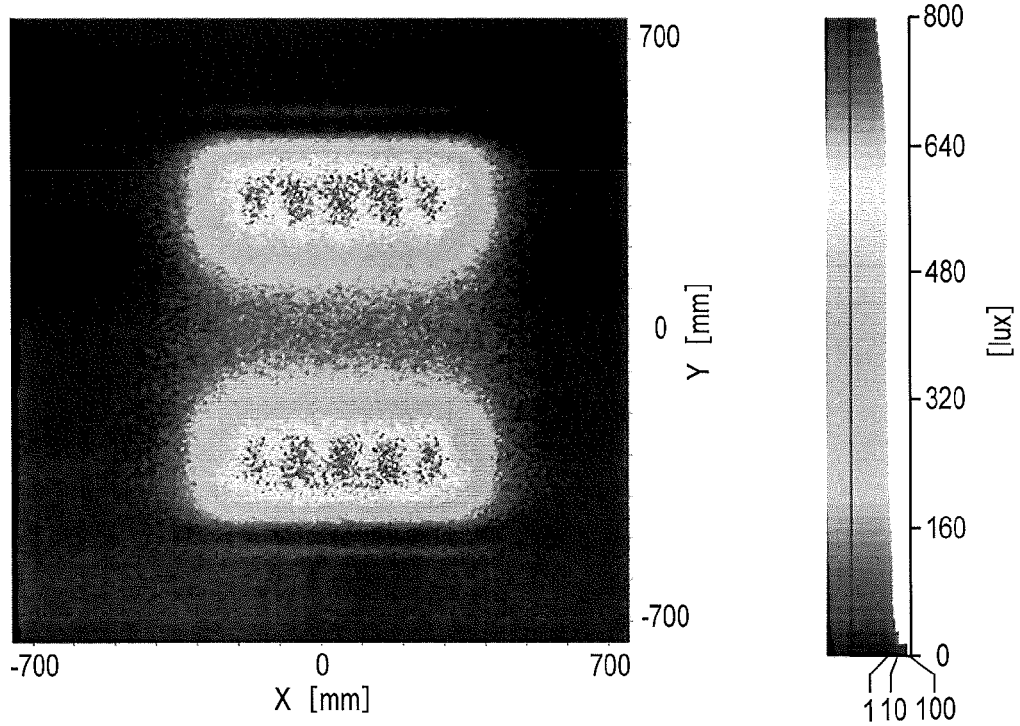
FIG. 10A illustrates illuminance distribution of the irradiation surface of the illumination apparatus for comparison when the light emitting devices for comparison are located at a height of h1.
Figure 10B:
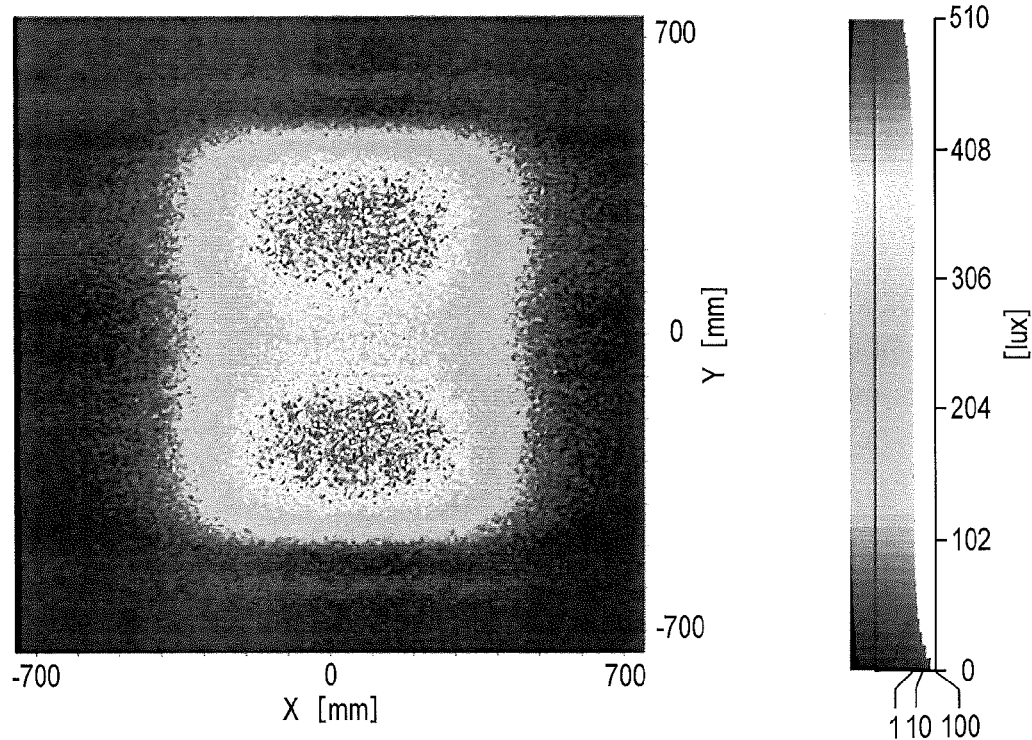
FIG. 10B illustrates illuminance distribution of the irradiation surface of the illumination apparatus for comparison when the light emitting devices for comparison are located at a height of h2.

FIG. 9 is a graph illustrating relative intensity of illuminance in an emitting direction of light emitting devices for comparison in which light flux controlling member 800 is mounted. FIG. 10A illustrates illuminance distribution of a irradiation surface of the illumination apparatus for comparison when the light emitting devices are located at a height of h1, and FIG. 10B illustrates illuminance distribution of a irradiation surface of the illumination apparatus for comparison when the light emitting devices are located at a height of h2. In FIG. 10A and FIG. 10B, illuminance distribution is obtained by simulating illuminance (L:lux) within a range of ±800 mm in an X direction and a Y direction from a reference position (O) which is a point of 450 mm from a point immediately below one of the light emitting devices for comparison of one side which face each other.

As illustrated in FIG. 9, light flux controlling member 800 is the same as light flux controlling member 160 in that while light flux controlling member 800 also emits part of the light to a side of the irradiation surface with respect to optical axis LA, light flux controlling member 800 emits more light to an opposite side of the irradiation surface with respect to optical axis LA. However, in light flux controlling member 800, a range of an emission angle of light having illuminance corresponding to the peak value is obviously narrower than that of light flux controlling member 160. Further, an emission angle (approximately 20°) of the light emitted toward the opposite side of the irradiation surface with respect to optical axis LA is obviously smaller than that of light flux controlling member 160. In this way, light flux controlling member 800 is inferior to light flux controlling member 160 in an ability to radiate light with sufficient intensity farther away in a larger area.

As a result, as illustrated in FIG. 10A, on the irradiation surface when the light emitting devices are located at a height of h1 from the irradiation surface, areas on the irradiation surface where the emitted light of the light emitting devices at both sides reach do not sufficiently overlap with each other, which causes uneven illuminance on the irradiation surface. Further, as illustrated in FIG. 10B, also on the irradiation surface when the light emitting devices are located at a height of h2 from the irradiation surface, a difference between intense illuminance and weak illuminance is large in areas on the irradiation surface where the emitted light of the light emitting devices at both side reach, which causes uneven illuminance on irradiation surface 192.

Figure 11A:
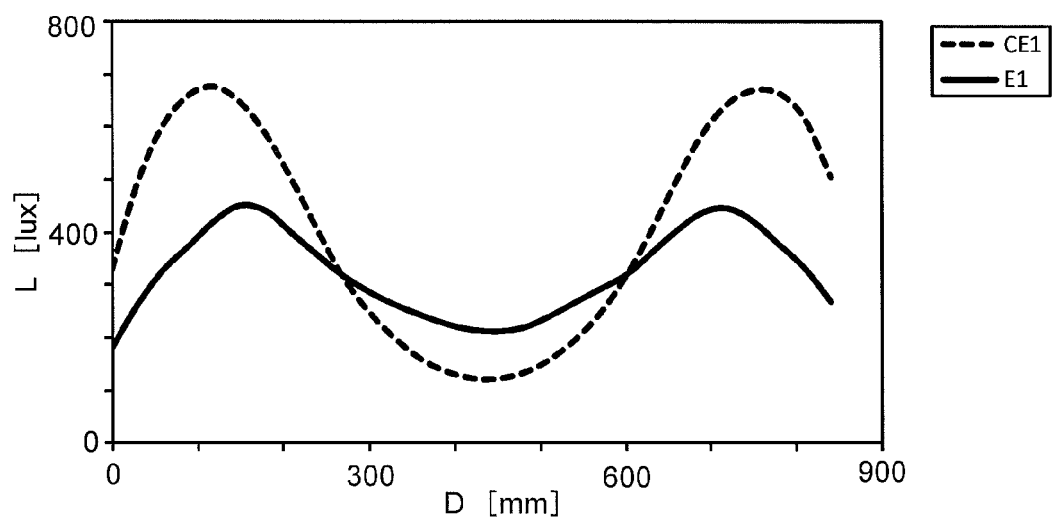
FIG. 11A illustrates illuminance distribution of the irradiation surface in a direction in which the light emitting devices face each other, when the light emitting devices are located at a height of h1 in the illumination apparatus according to the present embodiment and the illumination apparatus for comparison.
Figure 11B:
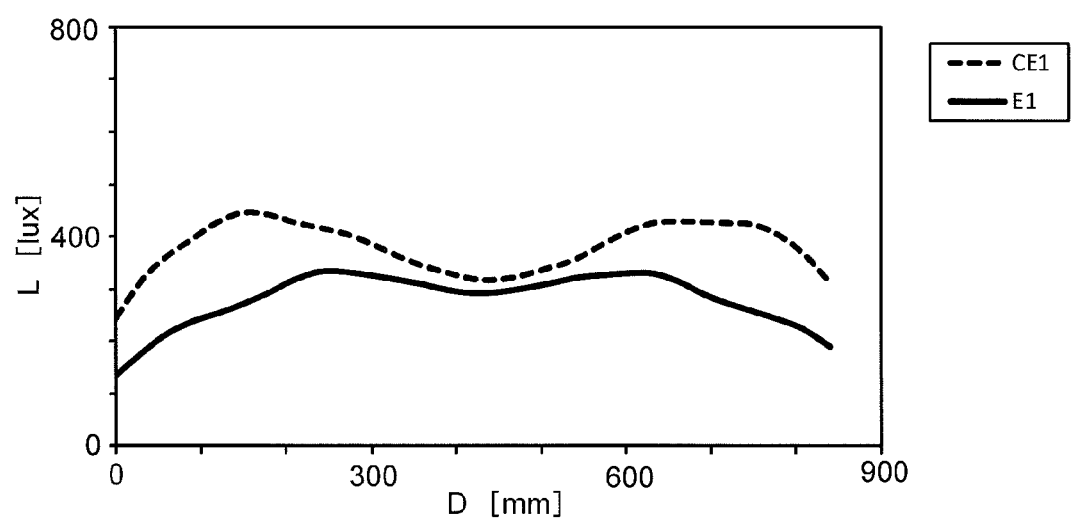
FIG. 11B illustrates illuminance distribution of the irradiation surface in a direction in which the light emitting devices face each other, when the light emitting devices are located at a height of h2 in the illumination apparatus according to the present embodiment and the illumination apparatus for comparison.

FIGS. 11A and 11B illustrate illuminance distribution of the irradiation surface in an illumination apparatus according to the present embodiment and an illumination apparatus for comparison. FIG. 11A illustrates illuminance distribution in a Y direction of a irradiation surface when light emitting devices are located at a height of h1 in illumination apparatus 190 and the illumination apparatus for comparison, and FIG. 11B illustrates illuminance distribution in the Y direction of the irradiation surface when the light emitting devices are located at a height of h2 in illumination apparatus 190 and the illumination apparatus for comparison. Note that in FIGS. 11A and 11B, "E1" (solid line) indicates illuminance of illumination apparatus 190, and "CE1" (short dashed line) indicates illuminance of the illumination apparatus for comparison.

As is clear from FIG. 11A and FIG. 11B, regardless of the height of the light emitting devices, illuminance of the irradiation surface of illumination apparatus 190 is equal to that of the illumination apparatus for comparison, and is more uniform than that of the illumination apparatus for comparison.

Figure 12A:
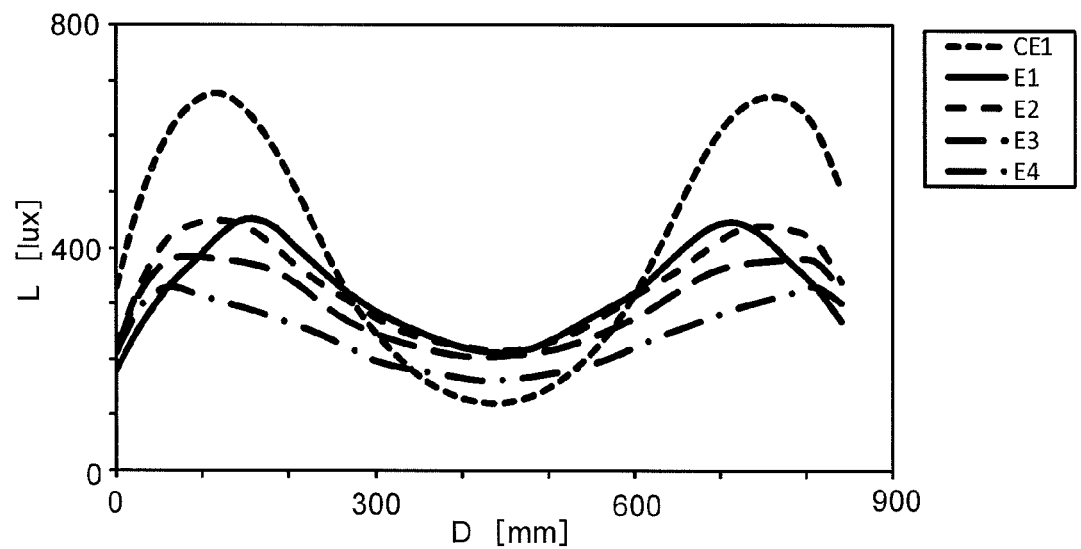
FIG. 12A illustrates illuminance distribution of the irradiation surface in a direction in which the light emitting devices face each other when the light emitting devices, of which first lens regions have different inclinations, are located at a height of h1 in the illumination apparatus included in the embodiment according to the present invention.
Figure 12B:
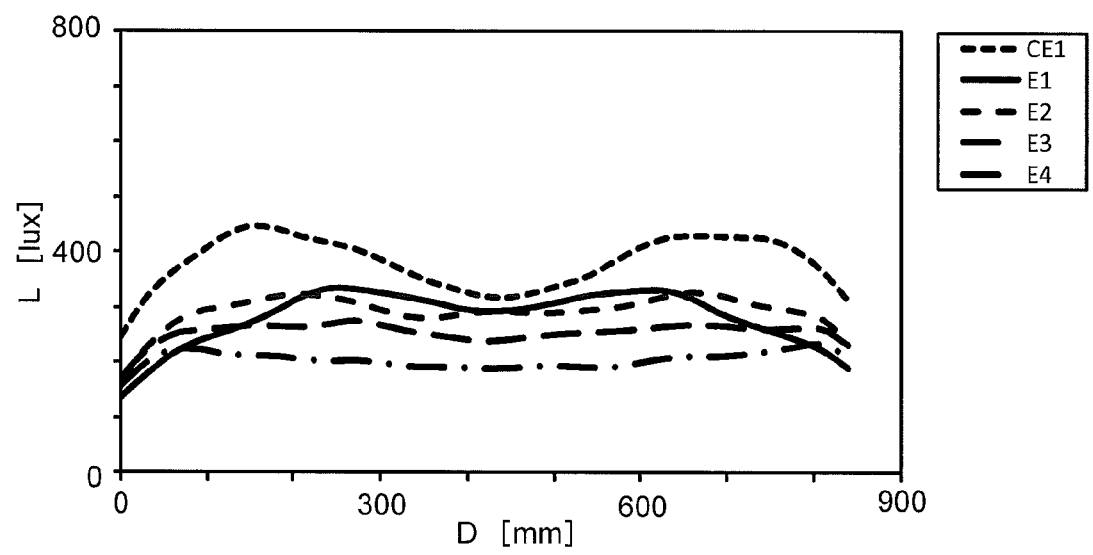
FIG. 12B illustrates illuminance distribution of the irradiation surface in a direction the light emitting devices face each other when the light emitting devices, of which first lens regions have different inclinations, are located at a height of h2 in the illumination apparatus included in the embodiment according to the present invention.

FIGS. 12A and 12B illustrate illuminance distribution in a Y direction of irradiation surface 192 when inclination of first lens region 10 of light flux controlling member 160 toward second lens region 50 with respect to a plane of emission region 164 (inclination of ridge line 178) is changed. FIG. 12A illustrates illuminance distribution in the Y direction of irradiation surface 192 when in the illumination apparatus, the light emitting devices in which the inclinations of first lens region 10 are different, respectively are located at a height of h1 from irradiation surface 192. FIG. 12B illustrates illuminance distribution in the Y direction of irradiation surface 192 when in the illumination apparatus, the light emitting devices in which the inclinations of first lens region 10 are different, respectively are located at a height of h2 from irradiation surface 192. In FIGS. 12A and 12B, "E1" (solid line) indicates illuminance of an illumination apparatus in which the inclination of first lens region 10 is 10°, "E2" (medium dashed line) indicates illuminance of an illumination apparatus in which the inclination is 6°, "E3" (long dashed line) indicates illuminance of an illumination apparatus in which the inclination is 15°, and "E4" (dashed-dotted line) indicates illuminance of an illumination apparatus in which the inclination is 30°. Note that the inclination in "CE1" (the illumination apparatus for comparison, short dashed line) is 0°.

As illustrated in FIG. 12A, when the light emitting devices are installed at a height of h1, the illuminance of the irradiation surface of illumination apparatuses E1 to E4 is comparably all equal compared to that of illumination apparatus CE1 and is further more uniform than that of illumination apparatus CE1. Further, in the above-described range of the inclination angle (6° to 30°), the uniformity of the illuminance of the irradiation surface further improves in accordance with an increase of the inclination. This may be because a light condensing effect of first projection 172 at first lens region 10 for the light emitted from light emitting element 140 becomes prominently apparent when the light emitting devices are closer to irradiation surface 192. Further, as illustrated in FIG. 12B, when the light emitting devices are installed at a height of h2, illuminance of the irradiation surface of illumination apparatuses E1 to E4 is all further closer compared to that of illumination apparatus CE1, and uniformity of the illuminance is further improved.

[Effect]

Light flux controlling member 160 includes first projection 172 in first lens region 10, in which $\theta_{11}$ and $\theta_{21}$ of first projection 172 are both larger than 0° and $\theta_{12}$ of first projection 172 is larger than $\theta_{22}$. Therefore, it is possible to emit light incident on first projection 172 from emission region 164 at a larger angle toward an opposite side of the irradiation surface with respect to optical axis LA. Accordingly, when light flux controlling member 160 is disposed obliquely with respect to irradiation surface 192, the light incident from light emitting element 140 can be uniformly emitted farther away on irradiation surface 192 from emission region 164.

Further, in order to improve intensity of the light which is emitted farther away on irradiation surface 192, it is further effective when a central angle of the fan shape of first lens region 10 is larger than 180°, and a central angle of the fan shape of second lens region 50 is smaller than 180°.

Further, in order to emit light symmetrically with respect to the above-described first plane, it is further effective when the shape of first lens region 10 and the shape of second lens region 50 are both plane-symmetric with respect to the first plane.

Further, in order to emit an intense light equivalent to the peak value from emission region 164 in a range of a larger emission angle from optical axis LA to the opposite side of the irradiation surface, it is further effective that along a direction in which first projection 172 is curved, a vertex angle of first projection 172 is constant.

Further, in order to condense light completely so as to emit the emitted light of light emitting element 140 from emission region 164 at a larger angle toward the opposite side of the irradiation surface with respect to optical axis LA, it is further effective that second lens region 50 has a plurality of second projections 182.

Further, in order to condense light emitted from light emitting element 140 completely and emit the light to be emitted from emission region 164 at a larger emission angle toward the opposite side of the irradiation surface with respect to optical axis LA, it is further effective that second projection 182 in second lens region 50 is disposed in parallel to emission region 164 and first projection 172 of first lens region 10 is disposed obliquely with respect to emission region 164.

Still further, in order to increase intensity of the light emitted from emission region 164 at a larger angle toward the opposite side of the irradiation surface with respect to optical axis LA, it is further effective that second projection 182 in second lens region 50 has a circular arc shape in a plan view thereof in which the center of curvature of second projection 182 serves as central axis CA, and the center of curvature of first projection 172 of first lens region 10 is located within first lens region 10 in a plan view thereof.

Further, because light emitting device 100 has light flux controlling member 160 and light emitting element 140, and optical axis LA of light emitting element 140 coincides with central axis CA, when light emitting device 100 is disposed obliquely with respect to irradiation surface 192, the emitted light from light emitting element 140 can be uniformly emitted farther away on irradiation surface 192.

Further, because illumination apparatus 190 has light emitting device 100 and planar irradiation surface 192, and light emitting device 100 is disposed so that optical axis LA of light emitting element 140 intersects with irradiation surface 192 at an acute angle and second lens region 50 is closer to irradiation surface 192 than first lens region 10, it is possible to provide illumination apparatus 190 in which light is irradiated uniformly and farther away on irradiation surface 192.

INDUSTRIAL APPLICABILITY

A light flux controlling member, light emitting devices and an illumination apparatus according to the present invention can uniformly and efficiently radiate light emitted from light emitting elements on a planar irradiation surface. The light emitting devices and the illumination apparatus according to the present invention is useful for application which requires uniform illumination from a direction oblique with respect to a irradiation surface, such as illumination for plant cultivation, task lights (desk lamps) and reading lights.

REFERENCE SIGNS LIST 10, 810 First lens region
50, 820 Second lens region
100 Light emitting device
120 Substrate
140 Light emitting element
160, 800 Light flux controlling member
162 Incidence region
164 Emission region
166 Tube portion
167 Flange portion
168 Boss
172 First projection
173 First refractive portion
175 Apex
174 First inclining surface
176 Second inclining surface
178 Ridge line
182 Second projection
183 Second refractive portion
184 Third inclining surface
186 Fourth inclining surface
190 Illumination apparatus
192 Irradiation surface
802 Projection
CA Central axis
LA Optical axis

The invention claimed is:

1. A light flux controlling member which controls light distribution of light emitted from a light emitting element, the light flux controlling member comprising:
  an incidence region on which the light emitted from the light emitting element is incident; and
  an emission region from which the light incident from the incidence region is emitted,
  wherein the incidence region comprises a first lens region and a second lens region which respectively have a fan shape in a plan view thereof,
  the first lens region comprises a projection having an arc shape in a plan view of the projection, the projection having a first inclining surface on which part of the light emitted from the light emitting element is incident and a second inclining surface at which the light incident from the first inclining surface is reflected toward the emission region,
  the second lens region receives the other part of the light emitted from the light emitting element and directs the incident light toward the emission region, and
  when a straight line which passes through an intersection point of a radius of the fan shape of the first lens region and a radius of the fan shape of the second lens region and which is parallel to a direction in which the incidence region is viewed in a plan view thereof is defined as a central axis of the light flux controlling member,
  a cross section of the projection when cut at a position on a first plane which includes the central axis and which passes through the center of the arc of the projection is defined as a first cross section, and a cross section of the projection when cut on a second plane which includes the central axis and which intersects with the first plane is defined as a second cross section,
  on the first cross section, when a vertex angle of the projection is divided by a straight line parallel to the central axis, an angle formed by the first inclining surface with respect to the straight line is defined as $\theta_{11}$, and an angle formed by the second inclining surface with respect to the straight line is defined as $\theta_{12}$, and
  on the second cross section, when the vertex angle of the projection is divided by the straight line, an angle formed by the first inclining surface with respect to the straight line is defined as $\theta_{21}$, and an angle formed by the second inclining surface with respect to the straight line is defined as $\theta_{22}$, the angle of $\theta_{11}$ and the angle of $\theta_{21}$ are both larger than 0°, and the angle of $\theta_{12}$ is larger than the angle of $\theta_{22}$.

2. The light flux controlling member according to claim 1, wherein a central angle of the fan shape of the first lens region is larger than 180°, and a central angle of the fan shape of the second lens region is smaller than 180°.

3. The light flux controlling member according to claim 1, wherein a shape of the first lens region and a shape of the second lens region are both plane-symmetric with respect to the first plane.

4. The light flux controlling member according to claim 1, wherein along a direction in which the projection is curved, the vertex angle is constant.

5. The light flux controlling member according to claim 1, wherein the second lens region comprises a projection in an arc shape in a plan view of the projection, the projection having a third inclining surface which receives the other part of the light emitted from the light emitting element and a fourth inclining surface at which the light incident from the third inclining surface is reflected toward the emission region.

6. The light flux controlling member according to claim 5, wherein
the projection in the second lens region is disposed in parallel to the emission region, and
a ridge line of the projection in the first lens region is disposed obliquely with respect to the emission region.

7. The light flux controlling member according to claim 6, wherein
the projection in the second lens region has a circular arc shape in the plan view and a center of curvature of the projection is the central axis in the plan view, and
a center of curvature of the projection in the first lens region is located within the first lens region in the plan view.

8. A light emitting device comprising the light flux controlling member according to claim 1 and a light emitting element,
wherein an optical axis of the light emitting element coincides with the central axis.

9. An illumination apparatus comprising the light emitting device according to claim 8 and a planar surface to be irradiated,
wherein the light emitting device is disposed so that the optical axis of the light emitting element intersects with the surface to be irradiated at an acute angle, and the second lens region is closer to the surface to be irradiated than the first lens region.

* * * * *